C. M. BISHOP.
MECHANISM FOR THE CONTROL OF AUTOMOBILES.
APPLICATION FILED JUNE 20, 1917.
1,274,978.
Patented Aug. 6, 1918.
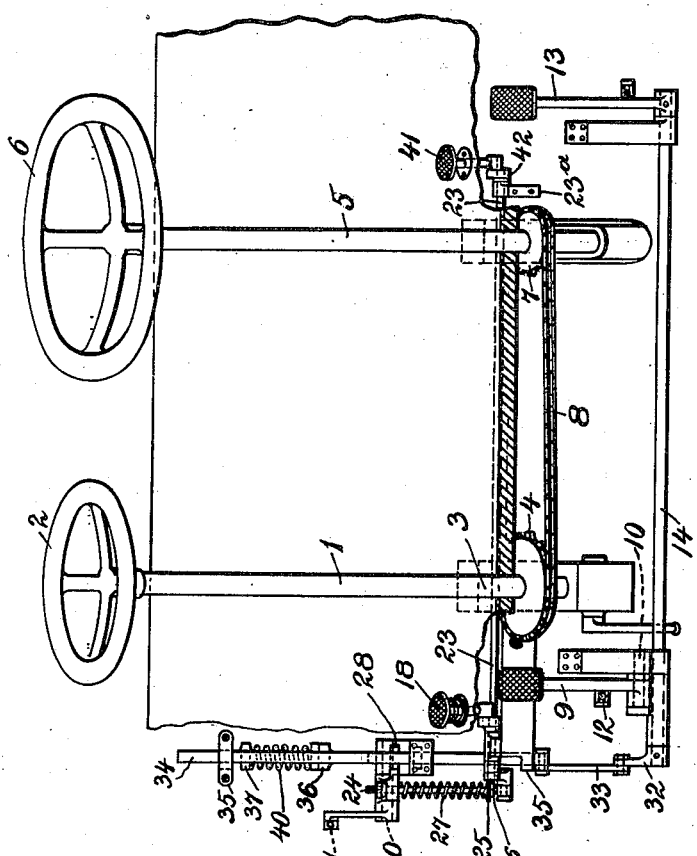
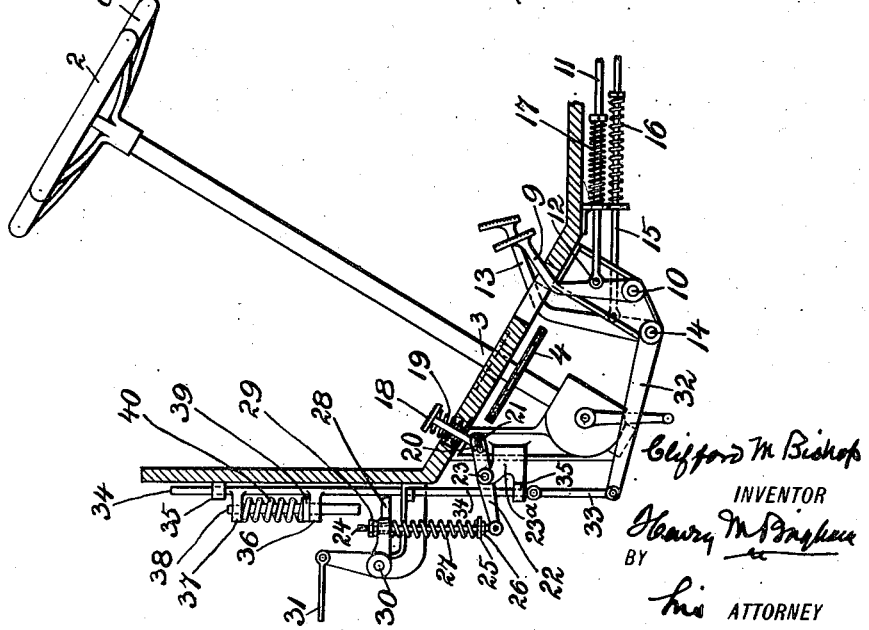
Clifford M. Bishop
INVENTOR
Henry M Bingham
BY
his ATTORNEY

UNITED STATES PATENT OFFICE.

CLIFFORD M. BISHOP, OF BROOKLYN, NEW YORK.

MECHANISM FOR THE CONTROL OF AUTOMOBILES.

1,274,978.  Specification of Letters Patent.  Patented Aug. 6, 1918.

Application filed June 20, 1917. Serial No. 175,753.

*To all whom it may concern:*

Be it known that I, CLIFFORD M. BISHOP, a citizen of the United States, residing in the city of New York, in the borough of Brooklyn, county of Kings, and State of New York, have invented certain new and useful Improvements in Mechanism for the Control of Automobiles, of which the following is a full, clear, and exact description.

This invention relates to mechanism for the control of automobiles and is particularly adapted to use in connection with automobiles which are being used for the instruction of novices in the operation thereof, and the object of the invention is to provide apparatus whereby the instructor may, by means of auxiliary mechanism, control the course of the automobile, apply the foot brake and close the throttle without interfering with the mechanism under the control of the person being instructed.

These and the other objects of my invention will be more fully disclosed in the following specification and claim.

In the drawings which accompany the specification, Figure 1 is a detailed elevation of my auxiliary mechanism, parts of the automobile being broken away so that the mechanism may be seen. Fig. 2 is a sectional detailed view on the line $x$—$x$ of Fig. 1.

Similar characters designate similar parts throughout the accompanying drawings, in which 1 is a steering column of the usual type, provided with a steering wheel 2 and a steering shaft 3, upon which is mounted a spur gear 4. Parallel to the column 1 is mounted an auxiliary shaft 5 provided with a steering wheel 6, which is of greater diameter than the steering wheel 2. Mounted on the shaft 5 is a spur gear 7 which is of lesser diameter than the spur gear 4. Mounted on the spur gears 4 and 7 is a chain
8. To a brake pedal 9, of the ordinary type, pivoted at 10, a rod 11 is pivotally secured at 12. The rod 11 operates brake mechanism of the ordinary type (not shown). 13 is an auxiliary brake pedal pivoted at 14. To this brake pedal is secured a rod 15, which also operates the same brake mechanism (not shown), which is operated by the rod 11. Springs 16 and 17 are for the purpose of normally maintaining the parts in the position shown in Fig. 2, when the brake mechanism operated by the rods 11 and 15 respectively is inoperative. 18 is the foot throttle control of the ordinary type which is supported in the position shown in Fig. 2, by the spring 19. The lower end of the throttle control 18 is provided with a pin 20, which operates in a slot 21 in a lever 22, secured to the shaft 23 mounted in bearings 23ª. To the other end of the lever is pivotally secured a rod 24, on which is mounted a stop disk 25 which may be positioned by a nut 26. On this rod is also mounted a spring 27, the upper end of which contacts with one end of the bell crank lever 28, through which the rod 24 passes. A nut 29 is adjustably secured on the upper end of the rod 24 and bears against the bell crank lever 28, which is pivoted at 30. To the other end of the bell crank lever 28 is secured a rod 31 which operates the throttle. Integral with the foot pedal 13 is an arm 32, to which is pivotally secured one end of a link 33. To the other end of the link 33 is pivotally secured a rod 34, which is mounted in the guides 35. In guides 36 and 37, formed on the rod 34, is mounted a rod 38, which is provided with a stop disk 39, and on this rod 38 is mounted a spring 40, one end of which bears against the stop disk 39 and the other against the guide 37. 41 is an auxiliary foot throttle control, the lower end of which bears against the lever 42 secured to the shaft 23.

The operation of my mechanism is as follows:

The novice to be instructed is seated adjacent to the steering wheel 2, the foot pedal 9, and the foot throttle control 18, and steers the car by means of the wheel 2, opens the throttle by the throttle control 18 and applies the foot brake and checks the car by means of the brake pedal 9. The instructor is seated on his right, adjacent to the steering wheel 6, and the brake pedal 13. As the spur gear 7 is of lesser diameter than the spur gear 4, and the steering wheel 6 is of greater diameter than the steering wheel 2, it is apparent that if the novice loses control of the car the instructor may assume control of the steering mechanism and control the course of the car through the steering wheel 6, even in opposition to the efforts of the novice, and by pressure on the pedal 13 may not only apply the foot brake but at the same time close the throttle, as the spring 40 is designed to be far stiffer and more powerful than the spring 27. The lower end of the rod 38, when the foot pedal 13 is depressed, is carried down until it contacts with the end of the bell crank lever 28 and compresses the spring 27 until the throttle is closed. Any further depression of the foot pedal 13 simply results in a compression of the spring 40. When the parts are in their normal position, as shown in Fig. 2, the lower end of the rod 38 is maintained at such a distance above the end of the lever 28 as not to interfere with the opening of the throttle control 18 and yet insure the closing of the throttle when the brake is applied. Through the foot throttle control 41, the instructor may open the throttle of the engine.

The mechanism described, therefore, enables the instructor not only to control the course of the machine, and open the engine throttle, but to apply the foot brake and close the throttle of the engine without interfering with the mechanism under the operation of the novice, and in opposition to any attempt by the novice to either open the throttle of the engine or direct the course of the car.

Having described my invention, I claim:—

Mechanism for the control of automobiles, comprising in combination primary steering mechanism and auxiliary steering mechanism operatively connected thereto, said auxiliary mechanism and the connection therefrom being constructed to exert an increased leverage upon the primary steering mechanism.

Signed at New York city, in the county of Kings and State of New York, this 14th day of June, 1917.

CLIFFORD M. BISHOP.

Witnesses:
 RAYMOND L. WOOD,
 JOHN McCORMICK, Jr.